US012682146B1

(12) United States Patent
Sharma et al.

(10) Patent No.: US 12,682,146 B1
(45) Date of Patent: Jul. 14, 2026

(54) OPTIMIZATION OF CIRCUIT DESIGN LAYOUT USING DYNAMIC PROBABILITY OF SUCCESS OF COMPONENT PLACEMENT IN INTEGRATED CIRCUIT DESIGN

(71) Applicant: Synopsys, Inc., Mountain View, CA (US)

(72) Inventors: Shveta Sharma, Los Altos, CA (US); Ranjan Prasad Mandal, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 708 days.

(21) Appl. No.: 18/128,645

(22) Filed: Mar. 30, 2023

(51) Int. Cl.
*G06F 30/392* (2020.01)
*G06F 30/398* (2020.01)
*G06F 111/04* (2020.01)

(52) U.S. Cl.
CPC .......... *G06F 30/392* (2020.01); *G06F 30/398* (2020.01); *G06F 2111/04* (2020.01)

(58) Field of Classification Search
CPC ...... G06F 30/39; G06F 30/392; G06F 30/394; G06F 30/398; G06F 2111/04; H10D 89/10
USPC .................................................. 716/119, 112
See application file for complete search history.

(56) References Cited

U.S. PATENT DOCUMENTS

2019/0392106 A1 * 12/2019 Northrop .............. G06F 30/392

* cited by examiner

*Primary Examiner* — Paul Dinh
(74) *Attorney, Agent, or Firm* — Andrew L. Dunlap; Haynes Beffel & Wolfeld LLP

(57) ABSTRACT

A method and system are provided for placing cells in a circuit design layout. The method includes placing the cells at candidate locations in the circuit design layout in accordance with design rules, and determining, for each location, a probability of design rule success for the placement of each cell of the cells based on one or more of the available candidate locations.

19 Claims, 7 Drawing Sheets

200

400

| Designs | Baseline Placement Runtimes | New Placement Runtimes (With Similar QOR) | Runtime Improvements |
|---------|------------------------------|-------------------------------------------|----------------------|
| Design A | 12,387sec | 1,235sec | ~10X |
| Design B | 10,217sec | 5,934sec | ~1.72X |
| Design C | 4,053sec | 2,656sec | ~1.52X |

OPTIMIZATION OF CIRCUIT DESIGN LAYOUT USING DYNAMIC PROBABILITY OF SUCCESS OF COMPONENT PLACEMENT IN INTEGRATED CIRCUIT DESIGN

TECHNICAL FIELD

The present disclosure relates to an electronic design automation (EDA) system. More particularly, the present disclosure relates to optimization of a circuit design layout using dynamic probability of success of component placement in an integrated circuit design.

BACKGROUND

The number of circuit components (cells) in an integrated circuit (IC) design has been increasing over the years. Due to the various requirements of the circuit components, placement of each of the circuit components on the circuit design layout should comply with design rules (e.g., placement and technology rules).

SUMMARY

A method and system are provided for performing placement of cells in a circuit design layout.

In an embodiment, the method includes placing the cells at candidate locations in the circuit design layout in accordance with the design rules, and determining, by a processing device, for each location of the candidate locations, a probability of design rule success for the placement of each cell of the cells based on one or more of the available candidate locations that meet the design rules.

In a further embodiment, the method can include determining a final location, of the candidate locations, for each cell of the cells in dependence on the probability of design rule success determined for each location of the candidate location.

In another embodiment, the method can include removing a candidate location, of the candidate locations, in dependence on the determined probability of design rule success for the placement of each cell at the candidate locations.

In another embodiment, one of the cells can be placed without reperforming place and route operations for all cells of the circuit design layout according to the design rules.

In an embodiment, the method can include performing optimization of the placement of the cells based on the probability of design rule success of each cell.

In another embodiment, the method can include performing optimization based on one or more of inserting an additional cell and sizing a cell of the cells.

In an embodiment, the method can include determining an optimization metric based on the optimization.

In a further embodiment, the method can include updating the probability of design rule success based on the optimization metric.

In another embodiment, the method can include storing the updated probability of design rule success in a library data structure.

In an embodiment, the method can include placing a second additional cell at a remaining candidate location in dependence on the probability of design rule success within a library data structure.

In another embodiment, the method can include predicting a probability of design rule success for placement of a second additional cell at additional candidate locations in the circuit design layout that are different from the candidate locations, and updating a library data structure to include determinations of probabilities of design rule success of the placement of the second additional cell at the additional candidate locations.

In an embodiment, the method can include determining, for each respective location of the candidate locations, a probability of design rule success of a neighboring cell that neighbors the respective location, and determining a final location, of the candidate locations, for a first additional cell in dependence on (i) the determined probabilities of design rule success of the first additional cell at the respective locations and (ii) the determined probabilities of success of the neighboring cells neighboring the respective locations.

In another embodiment, a neighboring cell can be a cell that is, at least, one of the cells that is within a threshold area adjacent to a respective location of the candidate locations.

In a further embodiment, at least one of the design rules can include one or more of: a complexity of one or more of a metal geometry and a base layer geometry of cells in the circuit design layout; an area constraint; a floorplan constraint; and a complexity level of neighboring cells located in a threshold area adjacent to aa location of a particular cell.

In an embodiment, a system for performing placement of cells in a circuit design layout is provided. The system can include a memory storing instructions and a processor, coupled with the memory to execute the instructions. The instructions when executed cause the processor to place the cells at candidate locations in the circuit design layout in accordance with design rules, and determine, for each location of the candidate locations, a probability of design rule success for the placement of each cell of the cells based on one or more of the available candidate locations that meet the design rules.

In another embodiment, the memory can maintain a library data structure including probability values of success for each candidate location of the candidate locations based on the determined probability of design rule success of a first additional cell at the candidate locations.

In a further embodiment, the processor can place a second additional cell at a remaining candidate location in dependence on the probability values of success within the library data structure.

In an embodiment, the processor can determine an optimization benefit and a probability of design rule success of locating the first additional cell in a given location of the candidate locations, determine an optimization benefit and a probability of design rule success of locating a second additional cell in the given location, wherein the optimization benefit of locating the second additional cell at the given location is greater than the optimization benefit of locating the first additional cell at the given location and wherein the probability of design rule success of locating the second additional cell in the given location is less than the probability of functional success of locating the first additional cell in the given location, and select the first additional cell to be located at the given location in dependence on the determined optimization benefits and probabilities of design rule success.

In an embodiment, a non-transitory computer readable medium having stored instructions for placement of cells in a circuit design layout is provided. The instructions when executed by a processor, cause the processor to determine a probability of design rule success for the placement of the initial cells in dependence on a cell library for a plurality of cells and design rules for the plurality of cells, retrieve second rules for placement of a first additional cell, of the plurality of cells, within the circuit design layout, place the first additional cell at available candidate locations in the circuit design layout in accordance with the second rules, and determine, for each location of the candidate locations, a probability of design rule success for the placement of the first additional cell.

In a further embodiment, the second rules include one or more of: a complexity of one or more of a metal geometry and a base layer geometry of cells in the circuit design layout; an area constraint; a floorplan constraint; and a complexity level of neighboring cells located in a threshold area adjacent to a location of a particular cell.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 provides example improvements of runtimes required to perform placement operations in accordance with some embodiments of the present disclosure.

DETAILED DESCRIPTION

Figure 1:
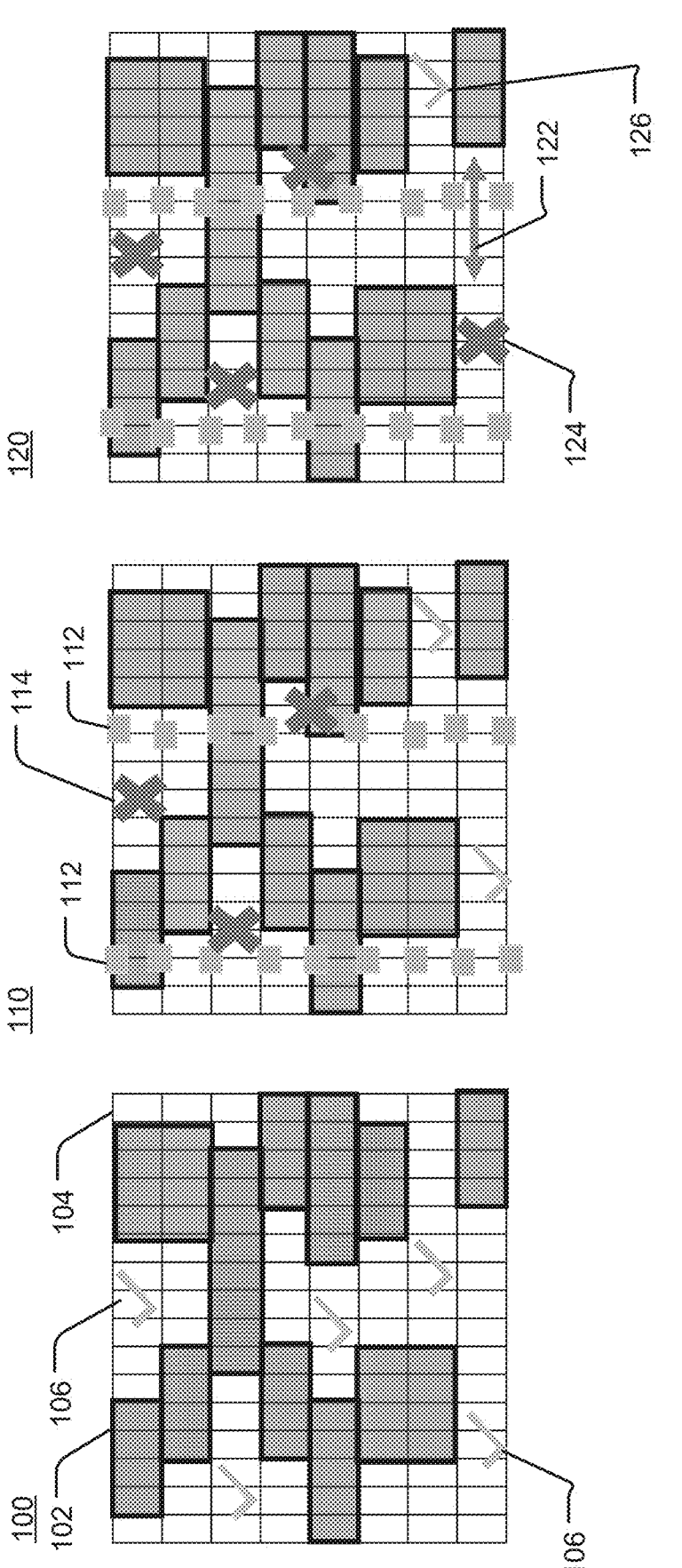
FIG. 1 illustrates an example of application of rules and determining probability of design rule success for placement of individual cells in multiple locations according to some embodiments of the present disclosure.

Aspects of the present disclosure relate to optimization of circuit design layout using dynamic probability of success of component (cell) placement in integrated circuit design.

The growing complexity of design rules (also referred to as placement and technology rules herein) in circuit component placement is creating new challenges for quality of results (QOR) when placing and routing circuit components (cells) in a circuit design layout. Optimizations of placements of the circuit components (cells) can target a vicinity of a location (e.g., a threshold area adjacent to the location) to improve timing results of the cells, power consumption of the cells and the amount of area occupied by the cells. However, the optimizations may not honor or meet the complex placement and technology rules near a targeted vicinity of the circuit design layout. In other words, increased optimization of target cells can result in decreased compliance of specific rules and/or decreased functional success of the operation of the cells. This can result in one or more of the following scenarios: (1) The intended QOR gains during these optimizations can be lost if it causes excessive cell disturbance to honor the complex rules to achieve these optimizations; and (2) optimizing the timing, power and area constraints while simultaneously meeting the complex placement and technology rules can result in a large runtime overhead due to excessive rule checking to honor the complex rules at each location.

The above-described problems can be magnified when timing/power or area optimizations further adds a new circuit component (cell) to the circuit design layout. When new cells are added to a circuit design layout, a place and route operation may be performed for the entire circuit design layout using the design rules associated with the already placed circuit components. This re-running of the place and route operation because of the newly added cells requires additional time and energy. As such, the present system and method optimizes placement of cells in a circuit layout design, such that new cells can be added to the circuit layout design without the requirement of re-running the placement of all of the cells against the rules of design and such that previous optimizations of placement can be used in subsequent circuit design layouts of an integrated chip. Such improvements will lead to increased QOR and a reduction of design and simulation time.

Specifically, embodiments described herein can predict the success probability of individual cells adhering to design rules at various locations within the circuit design layout to enable QOR optimizations to allow for better convergence when design rules are applied to the entire circuit. There can be a wide variety of complexities of design rules. For example, a less complex design rule can prohibit overlapping of cells, such that placement of cells will remove overlaps between cells. Further, for example, a more complex design rule can be a context dependent minimum implant layer rule that imposes minimum implant area constraints. The threshold voltage of a cell can be determined by the ion implantation of an implant area, and cells with different threshold voltage have different implant layers. Many different types of constraints can be imposed on the implant area as minimum implant area constraints. Specifically, minimum implant area constraints can impose rules that consider the implant layers of cells that are placed next to or near each other and that also consider the size and space of the cells that are next to or near each other. Multiple threshold voltages can be used for low power chip designs and high performance chip designs. In order to attain better performance, context dependent design rules can allow lower threshold voltage cells to be used on critical timing paths and can allow higher threshold voltage cells to be used on non-critical timing paths. Predicting the success probability of such design rules can improve runtime as it increases the success rate of these optimizations with respect to additional technology (design) rules and it can improve QOR by leading to less disturbance when honoring design rules in the targeted vicinity.

Furthermore, embodiments described herein can provide a handshake or feedback loop between legalization engines (e.g., a processing device that checks whether cell placement adheres to the design rules) and optimization engines (e.g., a processing device that improve timing, power, and/or area) by predicting the success of placement of cells. Individual cell placement success probability can be fed back to the placement component as part of the handshake for determination of success for placement of an entire group of cells of a circuit. This allows reduction of the time and energy required for reapplying all design rules while optimizing for QOR like timing, power, and area. The present disclosure describes procedures that enable placement optimization of cells, so as to pick individual cell placement locations that have an improved likelihood of honoring placement and technology rules. For example, embodiments described herein predict the probability of design rule success of complying with rules when cells are placed at various locations and then store the probability of success information for better convergence during prediction of success for the entire circuit.

The present disclosure describes at least three embodiments including: (i) quantifying the probability of successfully honoring placement and technology rules for an individual gate or cell at a given location using heuristics (also referred to herein as probability of design rule success); (ii) dynamically updating these probability values by continuously storing results for individual cells in a library data structure and data-mining the optimizations determined for the various individual cell placements in placement of subsequent cells with the contextual changes happening in the circuit design layout; and (iii) using probability of design rule success to locate several individual cells based on their placement success probability relative to each other as an additional benefit when performing optimizations for QOR improvement.

Technical advantages of the present disclosure include, but are not limited to, improving runtime when optimizing the circuit design layout of the integrated circuit and improving QOR by leading to less disturbance by honoring design rules in a targeted vicinity.

FIG. 1 illustrates an example of application rules and determining probability of design rule success for placement of individual cells in multiple locations according to some embodiments of the present disclosure.

Specifically, embodiments describe herein describe a place-and-route system and method of improving an operation of a place-and-route system. The method and system can perform operations including providing (to a computer system) both a cell library (data structure) describing a plurality of cells in an integrated circuit to be fabricated and design rules (e.g., first rules) for placement of initial cells (of the plurality of cells) in the circuit design layout of the integrated circuit. Initial cells can be placed at locations in the circuit design layout in accordance with the first rules. Referring to FIG. 1, three different circuit design layouts are illustrated: a first circuit design layout 100, a second circuit design layout 110 and a third circuit design layout 120.

The first circuit design layout 100 includes locations 102 for which circuit components (e.g., cells) have been placed using the cell library in accordance with the first rules. The locations 102 for which cells have been placed are darker than other available locations for which cells have not been placed. In this example, there are 69 available locations for placement of cells (e.g., circuit components). The probability of design rule success of the cells (e.g., the probability that the circuit components placed in the locations 102 will satisfy the design rules as desired or intended by designers of the integrated circuit) can be determined for the locations 102. In this example, it is assumed that the placement of the circuit components in the locations 102 will honor or conform with the first rules and that the probability of design rule success of the circuit components in the locations 102 satisfies or is above a desired threshold.

Further, in this example, the designer of the integrated circuit can decide to add an additional circuit component or components (e.g., cells) to the first circuit design layout 100 of the integrated circuit. This can be done by providing (to the computer system) additional rules (e.g., second rules) for placement of a first additional cell (of the plurality of cells)

within the first circuit design layout 100. As illustrated, according to the second rules, there are at least five available candidate locations 106 (see the five checkmarks) for placing the first additional cell. In this example, according to the second rules, the first additional cell will occupy 5 locations. This can be referred to as a rule related to available area required by the first additional cell (e.g., available area constraints). As illustrated, there are five different locations 106 where the first additional cell can be placed within the first circuit design layout 100 while complying with the second rules. Here, there is a 100% probability of design rule success with respect to the five locations 106 at which the first additional cell can be located. The embodiments describe herein determining for each of the five locations 106, the probability of design rule success of the first additional cell. Other locations in the first circuit design layout 100 will have a lower (e.g., 0%) probability of design rule success.

The second circuit design layout 110 illustrates the application of additional rules (e.g., additional second rules for the placement of the first additional cell). These additional rules include power and ground constraints for placing the first additional cell (e.g., floorplan constraints). As illustrated, power and ground components 112 are illustrated in the second circuit design layout 110. The additional rules prevent the first additional cell from being adjacent to the power and ground components 112.

As illustrated in FIG. 1, there are now three "X" marks 114 that indicate that of the previous five candidate locations 106, there are now three candidate locations that do not satisfy the additional rules. The probability of design rule success can be updated based on application of the new rules. In this example, there is a 40% probability of success using the initial five candidate locations 106, because three out of the five locations can no longer satisfy the additional rules.

The third circuit design layout 120 illustrates the application of more rules (e.g., additional second rules for the placement of the first additional cell). These additional rules include distance from neighboring cells constraints (e.g., neighboring cell constraints). A neighboring cell (or location) can be a cell/location that is closest (in any direction) to another cell/location. Furthermore, cells/locations can be classified as neighbors if (i) they are within a threshold distance from one another and/or (ii) they share, for example, an electrical path. In this example, the neighboring cell constraints require the first additional cell to be located within a certain distance of another cell. Specifically, the additional cell cannot be horizontally distanced more less than five locations from a horizontally adjacent cell. Arrow 122 illustrates this neighboring cell constraint, where location 124 does not satisfy the distance requirement. As illustrated, now out of the initial five candidate locations 106, there is only one location 126 (e.g., the final location) that satisfies the available area constraints, the floorplan constraints, and the neighboring cell constraints. Accordingly, the updated probability of design rule success of the initial five candidate locations 106 is now only 20%.

In more detail, the rules can include (i) available area constraints, which consider whether a threshold area is met in the vicinity of a particular location for the additional cell, (ii) floorplan constraints, which consider power, ground, routing, blockage requirements, (iii) neighboring constraints, which consider complexity and location of neighboring cells, which can exist due to context dependent rules like minimum implant area layout constraints (which, as described above, considers the constraints between neighboring cells with different voltage threshold and implant layers), and (iv) geometric constraints, which consider the complexity of metal and base layer geometries of a cell, such as a neighboring cell located in a threshold area adjacent to a location of a particular cell. Other constraints can also be implemented, such as a maximum number of buffers than can be driven by a particular cell. As mentioned above, a cell can be any circuit component, such as a logic gate. In an embodiment, the probability of design rule success can be heuristically determined.

This placement operation of the first additional cell can be performed without the additional time and energy required for reperforming placement operations for all of the other cells by applying the first rules with respect to the locations 102. In other words, the second rules are separately applied to the newly added cells without reapplying the first rules to all of the previous cells. This approach saves the additional time and energy of completely reapplying the first rules. Further, the first rules can be applied with respect to the final location 126 of the first additional cell, such that the first rules are re-applied to only the initial cells that surround the final location 126.

If there are multiple locations that satisfy the additional rules, then the first rules of the cells at locations 102 can be considered for determining an optimal location of the first additional cell. A threshold of a probability of design rule success can be set. For example, a threshold of 100% probability can be set. In this example with respect to the third circuit design layout 120 of FIG. 1, four of the five candidate locations 106 can be removed as candidate locations in order for the probability of design rule success to reach 100%, which satisfies the 100% threshold. If the threshold is 80%, then three out of the five locations 106 can be removed. Then with the 80% threshold satisfied with the remaining two candidate locations 106, further optimizations can be performed prior to finalizing the placement and routing of the circuit design layout.

Figure 2:
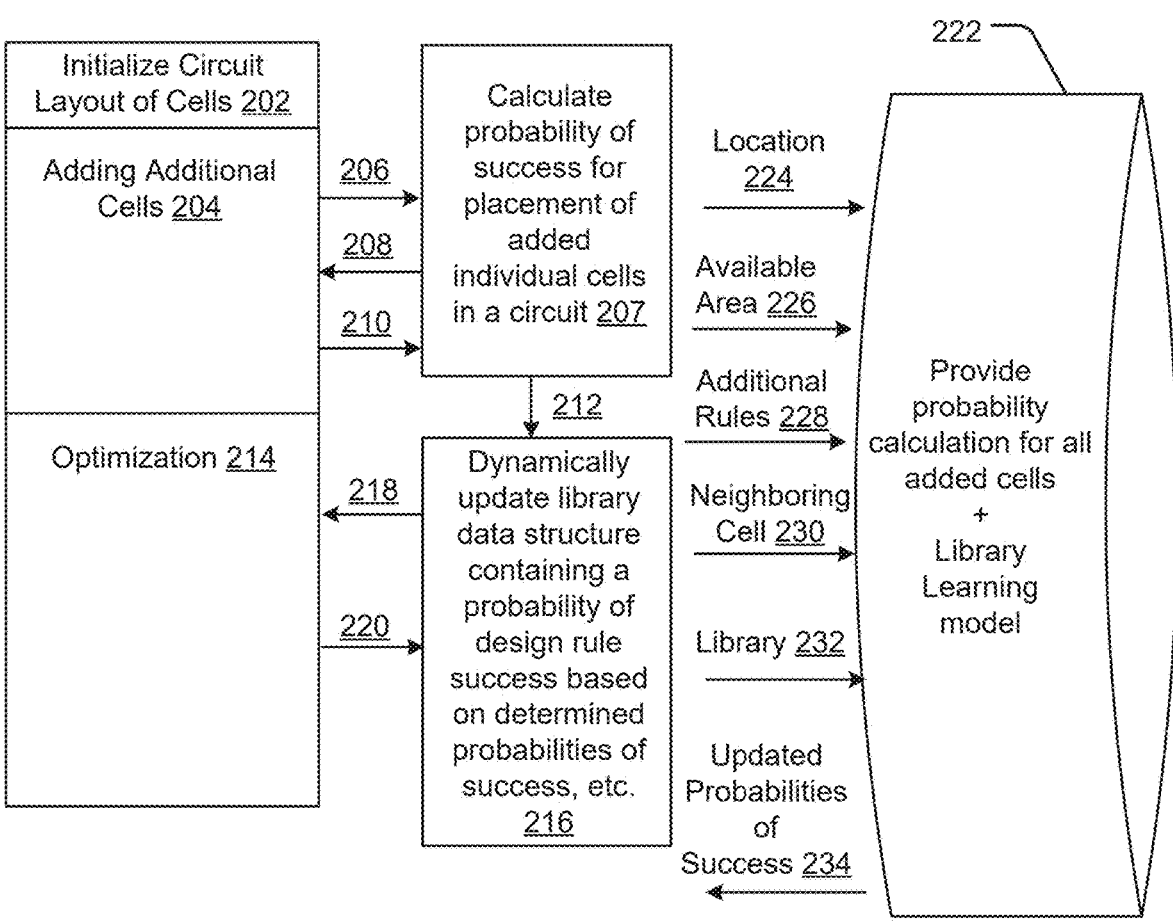
FIG. 2 provides an operation flow diagram for calculating probability of design rule success for cell placement and updating a library data structure for future placement of cells according to some embodiments of the present disclosure.

FIG. 2 provides an operation flow diagram 200 for calculating probability of success for cell placement and updating (maintaining) a library data structure for future placement of cells according to some embodiments of the present disclosure. The embodiments described herein with reference to FIG. 2 relate to dynamically updating the values of the probability of design rule success for cells by continuously data-mining actual optimizations and storing the continuously updated values in a library data structure along with contextual changes happening in the layout. This can be done after an initial placement of cells is determined and subsequent optimizations of the circuit design layout are being performed.

Referring to FIG. 2, the diagram 200 illustrates an operation 202 of initializing the circuit design layout of cells. This can include the initial placement of cells at locations (e.g., locations 102 of FIG. 1). This initial placement can include making sure that the cells will honor their respective rules. Next, at operation 204, one or more additional cells can be added. At operation 206, additional information (e.g., design rules) regarding the one or more additional cells can be considered to calculate the probability of design rule success for placement of the added one or more additional cells at various locations (operation 207). At operation 208, the one or more additional cells can be placed at various candidate locations. At operation 210, additional feedback (e.g., additional rules or performance information) regarding the one or more additional cells can provided back to operation 207 for further determining the probability of design rule success.

Operation 212 is responsive to a cell being placed at a particular location (which can be based on a calculated probability of design rule success) and can include providing the determined probabilities of design rule success to a computer system that includes maintained libraries (e.g., databases). At operation 216, a library data structure (e.g., a table) containing a probability of design rule success of each cell at each location can be dynamically updated based on the received determined probabilities of success, optimization result (from 220), other factors such as an available area constraint, a floorplan constraint, and a neighboring constraint. Furthermore, the dynamically updated library data structure can be provided at operation 218 so that optimization operations 214 can be performed to further optimize the circuit design layout. Optimization operations 214 can include techniques to improve timing, power and/or area by adding new cells or sizing pre-existing cells along a timing path (in contrast to placement techniques that involve placing newly added or sized cells on the layout such that they honor all of the design and technology node rules). Timing, power and area can be determined by static timing analysis. For example, the system can determine a setup/hold timing violation by performing a static timing analysis and then the optimization operations 214 can insert an additional repeater circuit component (e.g., a buffer or an inverter) in the path where the timing violation occurred. Further, optimization operations 214 can also replace a cell with a different cell that has a higher or lower drive strength in order to improve the setup/hold time and avoid a timing violation. Results of the optimization operations 214 can be provided, at operation 220, back to the system that dynamically updates the library data structure. For example, during the optimization operations 214, additional cells might be added or resizing of existing cells to improve timing, power and/or area can be performed. These optimizations operations 214 can have a feedback loop (operations 216, 218 and 220) that considers the constantly updated library data structures. The library data structures can be updated by additional circuit design layouts. This way, various circuit design layouts can be optimized and improved based on the success of other circuit design layouts. As operations 206-220 are performed, additional information can be gathered and implemented as a machine learning model. For example, location information and constraints 224, available area information and constraints 226, additional rules 228, neighboring cell information and constraints 230, and additional libraries 232 (e.g., that include probability of design rule success and/or library data structures) can be provided to a system and stored in storage 222. The system can then use the information from the storage 222 to obtain updated probabilities of success 234. Specifically, the information from the storage 222 can be used to predict a probability of design rule success for current circuit design layout placement and optimization operations based on historical information and can develop a machine learning model (e.g., a library learning model) that can use current cell libraries and rules to improve placement and optimization operations. These dynamically updated libraries of FIG. 2 can be implemented to carry out the operations described above with reference to FIG. 1.

Figure 3:
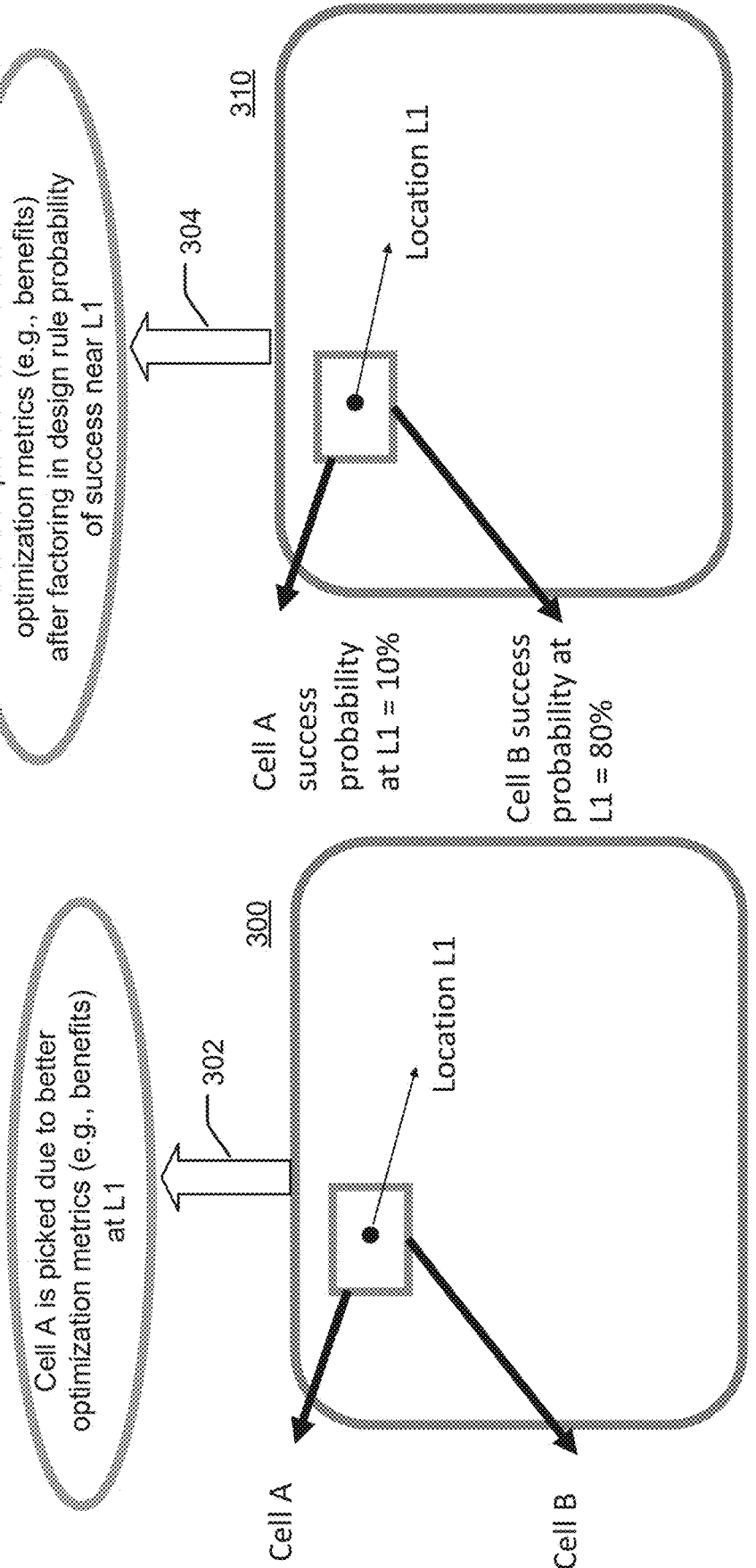
FIG. 3 shows an example of considering whether to place cell A or cell B at a particular location according to some embodiments of the present disclosure.

FIG. 3 shows an example of considering whether to place cell A or cell B at a particular location according to some embodiments of the present disclosure.

Embodiments related to FIG. 3 implement the placement operations described with respect to FIGS. 1 and 2 and consider the determined probabilities of design rule success as an additional benefit when choosing between two different cells for placement in a location when performing optimizations for timing, power, and area improvement. FIG. 3 illustrates a first circuit design layout 300 and a second circuit design layout 310. In this example, cell A and cell B are competing for a location in the circuit design layout.

In the first circuit design layout 300, an optimization technique 302 picks cell A to be located at location L1 (as opposed to cell B), because cell A has a better optimization metric (e.g., better timing, power and/or area). However, in the second circuit design layout 310, the placement and optimization techniques 304 described herein select cell B to be located at location L1 (as opposed to cell A), because cell A only has a 10% probability of design success at location L1 and cell B has an 80% probability of design success at location L1. Therefore, even though cell B has an inferior optimization metric as compared to cell A, cell B is selected at the better solution because of the higher probability of design rule success. These techniques can be implemented by (i) determining an optimization metric (e.g., benefit) and a probability of design rule success of locating the first additional cell (e.g., cell B) in a given location of the candidate locations, (ii) determining an optimization metric (e.g., benefit) and a probability of design rule success of locating a second additional cell (e.g., cell A) in the given location, wherein the optimization metric (e.g., benefit) of locating the second additional cell at the given location is greater than the optimization metric (e.g., benefit) of locating the first additional cell at the given location and wherein the probability of design rule success of locating the second additional cell in the given location is less than the probability of design rule success of locating the first additional cell in the given location, and (iii) selecting the first additional cell (e.g., cell B) to be located at the given location in dependence on the determined optimization metrics (e.g., benefits) and probabilities of design rule success (e.g., cell B is selected because it has higher overall benefit in terms of QOR optimization and probability of design rule success in comparison to cell A).

Figure 4:
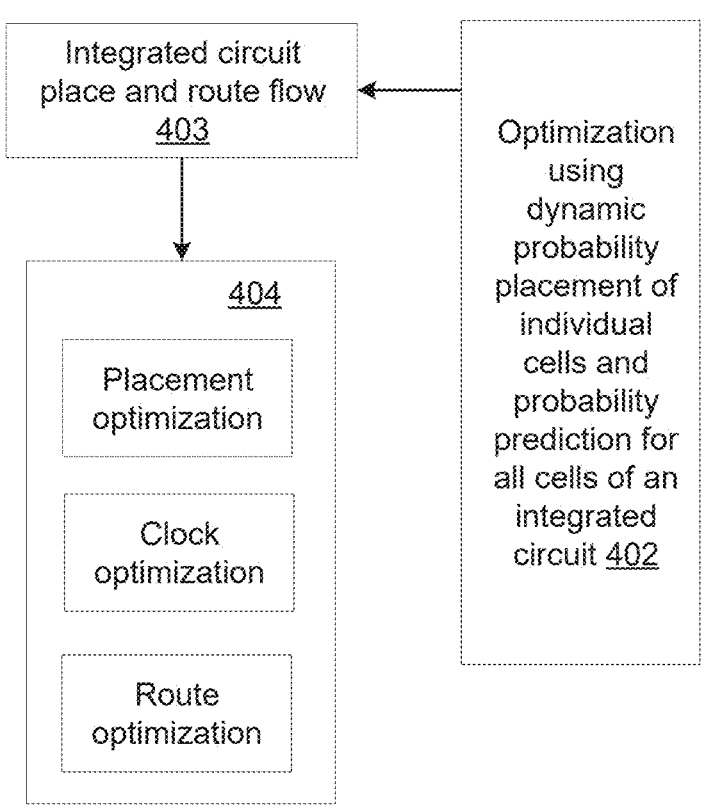
FIG. 4 provides an operation flow diagram of implementing dynamic optimization according to some embodiments of the present disclosure.

FIG. 4 provides an operation flow diagram of implementing dynamic optimization according to some embodiments of the present disclosure. Specifically, FIG. 4 illustrates an operation flow diagram 400 showing dynamic optimization of an entire circuit design layout of an integrated circuit. Operation 402 can perform placement and optimization for individual (new) cells in the circuit design layout and can perform placement and optimization for all cells in the circuit design layout. The results of the placement and optimization operation 402 can be used for the place and route flow operations 403 of the circuit design layout of the integrated circuit. Specifically, the results of the optimization operation 402 can be used for operations 404 including placement optimization, clock optimization and route optimization of the integrated circuit place and route flow 403.

FIG. 5 provides example improvements of runtimes required to perform placement operations in accordance with some embodiments of the present disclosure.

Specifically, FIG. 5 illustrates a table 500 that includes various designs 502 (i.e., Design A, Design B and Design C), baseline placement runtimes 504 while honoring all design rules for the various designs 502, new placement runtimes 506 for the various designs 502 using the placement and optimization techniques described herein, and runtime improvements 508 for the various designs 502. As illustrated, the runtime improvements using the placement and optimization techniques described herein can range from about 1.52 times faster to about 10 times faster.

Figure 6:
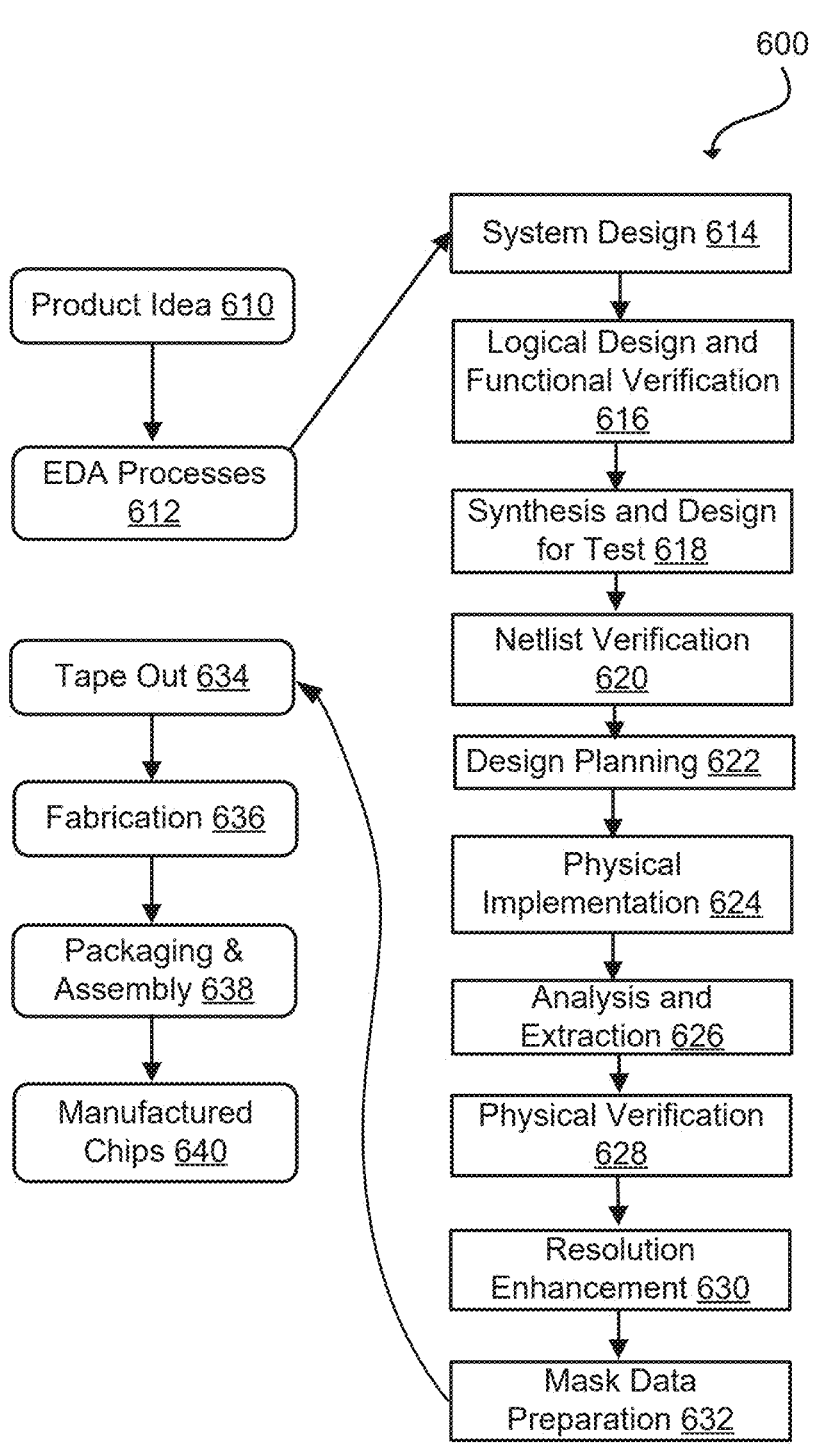
FIG. 6 is a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations.

The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a less detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of time and energy, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. The embodiments described herein, such as those regarding probability of design rule success, etc., can be performed at layout or physical implementation 624. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
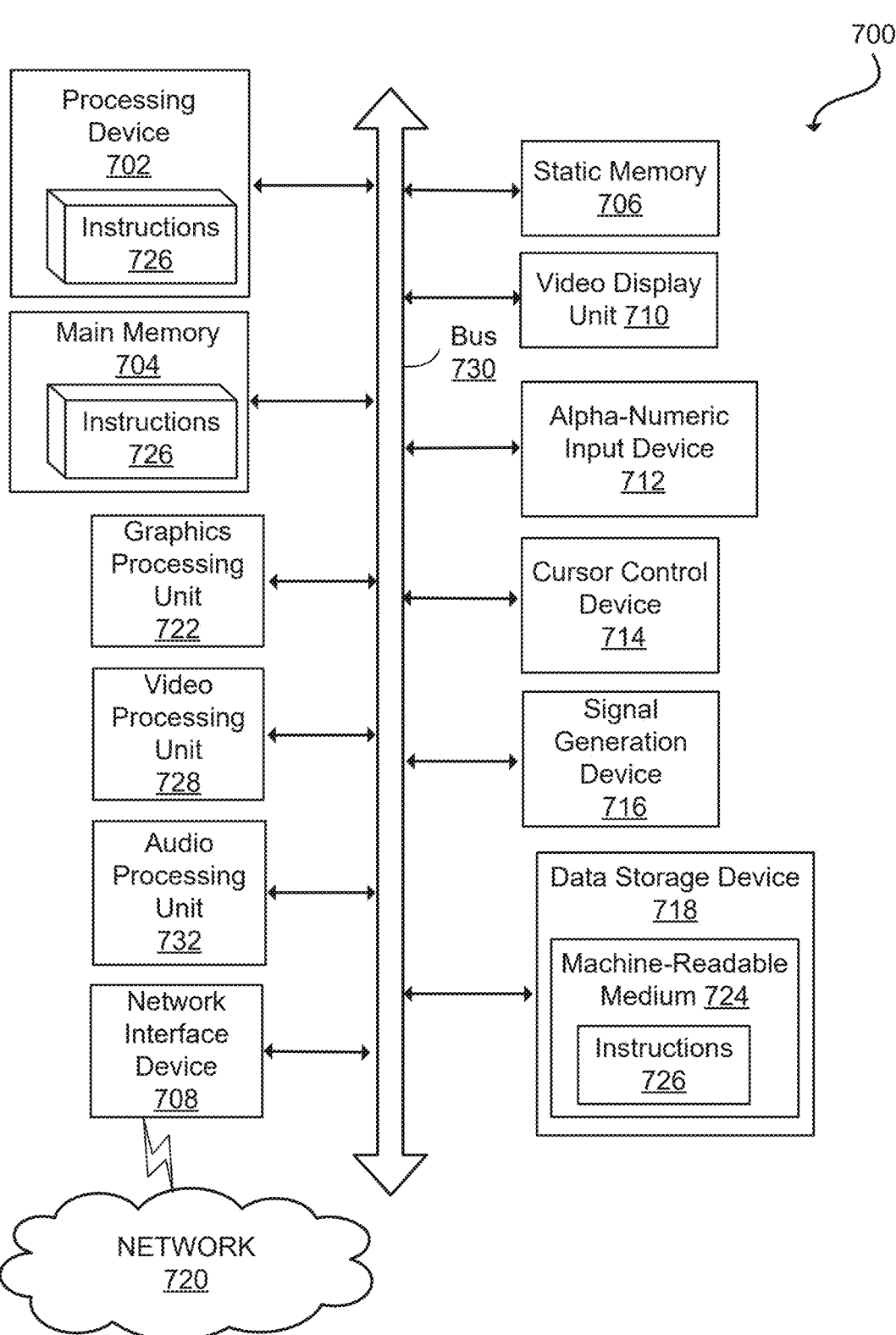
FIG. 7 illustrates an example computer system in which embodiments may operate.

FIG. 7 illustrates an example computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing placement of cells in a circuit design layout, the method comprising:
placing the cells at candidate locations in the circuit design layout in accordance with design rules;
determining, by a processing device, for each location of the candidate locations, a probability of design rule success for the placement of each cell of the cells based on one or more of available candidate locations;
predicting a first updated probability of design rule success for placement of a first additional cell at the candidate locations;
predicting a second updated probability of design rule success for placement of a second additional cell at additional candidate locations in the circuit design layout that are different from the candidate locations; and
updating a library data structure to include the first updated and the second updated probabilities of design rule success of the placement of the first additional cell at the candidate locations and the second additional cell at the additional candidate location.

2. The method of claim 1, further comprising determining a final location, of the candidate locations, for each cell of the cells in dependence on the first updated and the second updated probabilities probability of design rule success.

3. The method of claim 1, further comprising removing a candidate location, of the candidate locations, in dependence on the first updated and the second updated probabilities of design rule success.

4. The method of claim 1, wherein one of the cells is placed without determining a probability of design rule success for all cells of the circuit design layout according to the design rules.

5. The method of claim 1, further including performing optimization of the placement of the cells based on the probability of design rule success for the placement of each cell.

6. The method of claim 5, further comprising performing optimization based on one or more of inserting an additional cell and sizing a cell of the cells.

7. The method of claim 6, further comprising determining an optimization metric based on the optimization.

8. The method of claim 7, further comprising updating a probability of design rule success of at least one cell based on the optimization metric.

9. The method of claim 8, further comprising storing the updated probability of design rule success in the library data structure.

10. The method of claim 8, further comprising placing another additional cell at a remaining candidate location in dependence on the stored probability of design rule success of the at least one cell within the library data structure.

11. The method of claim 1, further comprising:
determining, for each respective location of the candidate locations, a neighboring probability of design rule success for placement of a neighboring cell that neighbors the respective location; and
determining a final location, of the candidate locations, for the first additional cell in dependence on (i) the first updated probability of design rule success for placement of the first additional cell at the respective locations and (ii) the determined neighboring probabilities of design rule success for placement of success of the neighboring cells neighboring the respective locations.

12. The method of claim 11, wherein a neighboring cell is a cell that is, at least, one of the cells that is within a threshold area adjacent to a respective location of the candidate locations.

13. The method of claim 1, wherein at least one of the design rules includes one or more of:

a complexity of one or more of a metal geometry and a base layer geometry of cells in the circuit design layout;

an area constraint;

a floorplan constraint; and a complexity level of neighboring cells located in a threshold area adjacent to a location of a particular cell.

14. A system for performing placement of cells in a circuit design layout, the system comprising:

a memory storing instructions; and a processor, coupled with the memory and to execute the instructions, the instructions when executed cause the processor to:

place the cells at candidate locations in the circuit design layout in accordance with design rules;

determine, for each location of the candidate locations, a probability of design rule success for the placement of each cell of the cells based on one or more of available candidate locations;

determine an optimization metric and a probability of design rule success of locating a first additional cell in a given location of the candidate locations;

determine an optimization metric and a probability of design rule success of locating a second additional cell in the given location; and select the first additional cell to be located at the given location based on the optimization metrics and the probabilities of design rule success of the first additional cell and the second additional cell.

15. The system of claim 14, wherein the processor stores, in the memory, a library data structure including probability values of success for each candidate location of the candidate locations based on the determined probability of design rule success of the placement of the first additional cell at the candidate locations.

16. The system of claim 15, wherein the processor:

places the second additional cell at a remaining candidate location in dependence on the stored probability values of success.

17. The system of claim 14, wherein the processor:

determines an optimization metric and a probability of design rule success of locating a first additional cell in a given location of the candidate locations;

determines an optimization metric and a probability of design rule success of locating a second additional cell in the given location, wherein the optimization metric of locating the second additional cell at the given location is greater than the optimization metric of locating the first additional cell at the given location and wherein the probability of design rule success of locating the second additional cell in the given location is less than the probability of design rule success of locating the first additional cell in the given location; and selects the first additional cell to be located at the given location in dependence on the determined optimization metrics and the probabilities of design rule success of the first additional cell and the second additional cell.

18. A non-transitory computer readable medium comprising stored instructions for placement of cells in a circuit design layout, the instructions when executed by a processor, cause the processor to:

determine a probability of design rule success for placement of initial cells in dependence on a cell library for a plurality of cells and first design rules for the plurality of cells;

retrieve second design rules for placement of a first additional cell, of the plurality of cells, within the circuit design layout;

place the first additional cell at available candidate locations in the circuit design layout in accordance with the second design rules; and determine, for each location of the candidate locations, a probability of design rule success with respect to the second design rules for the placement of the first additional cell.

19. The non-transitory computer readable medium of claim 18, wherein the second rules includes one or more of:

a complexity of one or more of a metal geometry and a base layer geometry of cells in the circuit design layout;

an area constraint;

a floorplan constraint; and a complexity level of neighboring cells located in a threshold area adjacent to a location of a particular cell.

\* \* \* \* \*